Patented Dec. 15, 1942

2,304,877

UNITED STATES PATENT OFFICE 2,304,877

SYNTHETIC LEATHER COMPOUND

Joseph Birnbaum, New York, N. Y.

No Drawing. Application May 12, 1939,
Serial No. 273,216

4 Claims. (Cl. 260—762)

The present invention relates to a composition of matter suitable for coating traction surfaces and its object is to improve the driving conditions of a belt on a pulley in order to be highly effective in its operation, inexpensive in manufacture and durable.

It was proposed already to cover the smooth pulley with a layer or layers of paper, linen, rubber or leather and the best results hitherto achieved have been afforded by leather or rubber bands. However these bands have the inconvenience of being costly, troublesome and of little durability. After short use, either the roughness disappears and slips occurs as with an uncovered pulley or the band is torn off.

The present invention retains the advantage of applying a real leather covering while avoiding the aforesaid inconvenience. Moreover, the plastic composition, invented and proposed by myself and the method of application are extremely cheap in comparison with the cost of making and fitting real leather bands on pulleys and other items with complicated forms. Renewal costs also are very small, since the covering can be considered permanent, being capable of retouching as wear out, in order to bring it back to its original effective state.

I propose the following formula to obtain a leathery compound, adhering perfectly on smooth metal and wood surfaces and adapted to dry with a fairly solid surface like a real leather:

| | Parts by weight |
|---|---|
| Very fine rubber dust | 50 |
| Liquid sodium silicate of 35 degrees Baumé | 50 |

These proportions may be altered according to the consistence of the rubber dust or ground rubber and I do not limit myself to the precise proportions herein set forth as they may be varied by those skilled in the art in accordance with the particular purposes for which they are intended and the conditions under which they are to be utilized.

To obtain a leathery aspect and odor, I add crude oil birch tar. To avoid the decomposition of the sodium silicate by the said acid tar oil, I first mix the oil with caustic soda solution until obtaining an alkaline reaction.

The coloring may be obtained by any anilin on an alkaline base.

Having now particularly described and ascertained the nature of my said invention and in what manner the same is to be performed, I declare that what I claim is:

A composition of matter for the purposes described comprising liquid sodium silicate and rubber dust in approximately equal amounts.

JOSEPH BIRNBAUM.